United States Patent
Nakamura et al.

(10) Patent No.: US 11,753,527 B2
(45) Date of Patent: Sep. 12, 2023

(54) FLAME RETARDANT COMPOSITION AND FLAME-RETARDANT SYNTHETIC RESIN COMPOSITION CONTAINING SAME

(71) Applicant: ADEKA CORPORATION, Tokyo (JP)

(72) Inventors: Michio Nakamura, Saitama (JP); Tsutomu Umeki, Saitama (JP); Tetsuo Kamimoto, Saitama (JP); Genta Kokura, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 101 days.

(21) Appl. No.: 16/490,916

(22) PCT Filed: Mar. 29, 2018

(86) PCT No.: PCT/JP2018/013141
§ 371 (c)(1),
(2) Date: Sep. 4, 2019

(87) PCT Pub. No.: WO2018/181676
PCT Pub. Date: Oct. 4, 2018

(65) Prior Publication Data
US 2020/0010642 A1 Jan. 9, 2020

(30) Foreign Application Priority Data
Mar. 31, 2017 (JP) .................. 2017-072745

(51) Int. Cl.
| | | |
|---|---|---|
| *C08K 5/52* | (2006.01) | |
| *C08K 3/32* | (2006.01) | |
| *C08K 5/18* | (2006.01) | |
| *C08K 5/3492* | (2006.01) | |
| *C09K 21/04* | (2006.01) | |
| *C09K 21/10* | (2006.01) | |
| *C08L 101/00* | (2006.01) | |

(52) U.S. Cl.
CPC .............. *C08K 5/5205* (2013.01); *C08K 3/32* (2013.01); *C08K 5/18* (2013.01); *C08K 5/34922* (2013.01); *C09K 21/04* (2013.01); *C09K 21/10* (2013.01); *C08K 2003/323* (2013.01); *C08L 101/00* (2013.01); *C08L 2201/02* (2013.01)

(58) Field of Classification Search
CPC .................................. C09K 21/12
See application file for complete search history.

(56) References Cited

U.S. PATENT DOCUMENTS

| | | | |
|---|---|---|---|
| 3,936,416 A | 2/1976 | Brady | |
| 4,010,137 A | 3/1977 | Brady | |
| 6,008,349 A * | 12/1999 | Suzuki | C08G 79/02 544/195 |
| 2003/0088000 A1 | 5/2003 | Kimura et al. | |
| 2015/0080486 A1* | 3/2015 | Kasowski | C08K 5/5205 558/158 |
| 2015/0337204 A1 | 11/2015 | Yamazaki et al. | |

FOREIGN PATENT DOCUMENTS

| | | |
|---|---|---|
| CN | 1397590 A | 2/2003 |
| CN | 104870613 A | 8/2015 |
| EP | 1277794 A1 | 1/2003 |
| EP | 2933311 A1 | 10/2015 |
| JP | H08-176343 A | 7/1996 |
| JP | H10-81691 A | 3/1998 |
| JP | H11-130413 A | 5/1999 |
| JP | 2001-302222 A | 10/2001 |
| JP | 2003-026935 A | 1/2003 |
| KR | 2003-0007204 A | 1/2003 |
| KR | 2015-0097588 A | 8/2015 |
| TW | I284658 B | 8/2007 |
| TW | 201439171 A | 10/2014 |
| WO | 2014/097967 A1 | 6/2014 |

OTHER PUBLICATIONS

International Search Report, dated Jun. 5, 2018, from corresponding PCT application No. PCT/JP2018/013141.

* cited by examiner

*Primary Examiner* — Peter F Godenschwager
(74) *Attorney, Agent, or Firm* — NIXON & VANDERHYE

(57) ABSTRACT

In a flame retardant composition containing (poly)phosphoric acid amine salts, the amine excess ratio (mol %) represented by formula (I) is 0.01-10 mol %. In the formula, n represents the number of types of amines in the (poly)phosphoric acid amine salt, and $A_1$-$A_n$ represent the maximum number of dissociation steps of each amine. Here, the maximum number of dissociation steps is the maximum number of dissociation steps with a base dissociation constant pKb at 25° C. in the 0-13 range. $B_1$-$B_n$ represent the number of mol of the amine when an amine is assumed to be present alone in the (poly)phosphoric acid amine salt.

11 Claims, No Drawings

FLAME RETARDANT COMPOSITION AND FLAME-RETARDANT SYNTHETIC RESIN COMPOSITION CONTAINING SAME

TECHNICAL FIELD

This invention relates to a flame retardant composition and a flame-retardant synthetic resin composition containing the same.

BACKGROUND ART

Synthetic resins have been applied widely to constructional materials, automotive parts, packaging materials, agricultural materials, housings of household electric appliances, toys, and so forth because of the advantages, such as good moldability, excellent thermal and mechanical characteristics, low specific gravity, and low weight. Most of synthetic resins are combustible and it is necessary to impart flame retardancy to them for some applications. In particular, highly combustible synthetic resins including polyolefin resins are frequently used in a wide range of fields, and it is necessary to add a flame retardant to the resins to make them flame-retardant.

It is well known that flame retardation of synthetic resins is achieved by using halogen flame retardants, inorganic phosphorus flame retardants, including red phosphorus and polyphosphoric acid flame retardants such as ammonium polyphosphates, organic phosphorus flame retardants typified by triarylphosphoric ester compounds, metal hydroxides such as magnesium hydroxide, antimony oxide, which is a flame retardant synergist, and melamine compounds, either alone or in combinations thereof. Halogen flame retardants have the problem of toxic gas generation upon combustion. The problem with metal hydroxides is that sufficient flame retardancy is not obtained unless they are added in large quantities, and such addition impairs resin processability and reduces the physical properties of molded products. Hence, it has been attempted to use a phosphorous flame retardant that is free of these problems.

For example, patent literature 1 listed blow discloses a flame-retardant synthetic resin composition containing an ammonium polyphosphate, a polyhydroxy compound, a triazine ring-containing compound, and a metal hydroxide. Patent literatures 2 and 3 below disclose flame-retardant synthetic resin compositions containing a melamine polyphosphate and pent-, dipenta-, or tripenta-erythritol.

Inter alia, intumescent flame retardants exhibit excellent flame retardancy. Intumescent flame retardants swell on combustion to form a swollen surface layer, which prevents diffusion of a decomposition product and heat transfer thereby to achieve flame retardation. Such a flame retardant is described, e.g., in patent literature 4 below.

However, the polyphosphate, which is the main component of the intumescent flame retardants, is insufficient in hydrolysis resistance due to its high polarity. The problem with a flame-retardant synthetic resin composition containing the intumescent flame retardant is that a hydrolysis product of the polyphosphate adversely affects the weatherability of the resin composition. Furthermore, a polyphosphate may contain a highly acidic salt produced through, e.g., a side reaction in the preparation of the polyphosphate by heat-condensation. When added to a synthetic resin, a flame retardant containing such a polyphosphate can have an adverse influence on the weatherability of the resulting flame-retardant synthetic resin composition.

CITATION LIST

Patent Literature

Patent literature 1: JP 8-176343A
Patent literature 2: U.S. Pat. No. 3,936,416A
Patent literature 3: U.S. Pat. No. 4,010,137A
Patent literature 4: US 2003088000A1

SUMMARY OF INVENTION

An object of the invention is to provide a flame retardant composition and a flame-retardant synthetic resin composition that exhibit hydrolysis resistance and weatherability as well as flame retardancy.

The invention has accomplished the above object by the provision of a flame retardant composition containing an amine (poly)phosphate and having an amine excess of 0.01 to 10 mol %. The amine excess is represented by formula (1):

[Math. 1]

$$\text{Amine excess (mol \%)} = [\Sigma(A_n \times B_n(\text{mol})) - \text{phosphorus atoms (mol) contained in flame retardant composition}]/\text{phosphorus atoms (mol) contained in flame retardant composition} \times 100 \quad (1)$$

wherein n represents the number of the kinds of the amines in the amine (poly)phosphate; $A_1$ to $A_n$ each represent the maximum number of dissociation stages of the respective amines, the maximum number of dissociation stages being defined as the maximum number of the dissociation stages in which the base dissociation constant pKb is in the range of from 0 to 13 at 25° C.; and $B_1$ to $B_n$ each represent the number of moles of the respective amines of the amine (poly)phosphate when the amine is assumed to be present alone.

The invention also provides a flame retardant composition containing an amine (poly)phosphate and an amine compound and having an amine excess of 0.01 to 10 mol %, the amine excess being represented by formula (1):

[Math. 2]

$$\text{Amine excess (mol \%)} = [\Sigma(A_n \times B_n(\text{mol})) - \text{phosphorus atoms (mol) contained in flame retardant composition}]/\text{phosphorus atoms (mol) contained in flame retardant composition} \times 100 \quad (1)$$

wherein n represents the total of the number of the kinds of amines in the amine (poly)phosphate and the number of the kinds of the amine compounds; $A_1$ to $A_n$ each represent the maximum number of dissociation stages of the respective amines and amine compounds, the maximum number of dissociation stages being defined as the maximum number of the dissociation stages in which the base dissociation constant pKb is in the range of from 0 to 13 at 25° C.; and $B_1$ to $B_n$ each represent the number of moles of the respective amines of the amine (poly)phosphate when the amine is assumed to be present alone or the number of moles of the respective amine compounds.

The invention also provides a flame-retardant synthetic resin composition containing the flame retardant composition and a molded article of the flame-retardant synthetic resin.

DESCRIPTION OF EMBODIMENTS

The invention will be described with reference to its preferred embodiments. The invention relates to a flame retardant composition and a flame-retardant synthetic resin composition. As used herein, the term "flame retardant composition" refers to a composition containing at least one flame retardant. The term "flame-retardant synthetic resin composition" herein refers to a composition containing at least one synthetic resin and at least one flame retardant component, and having flame retardancy. The term "flame retardancy" herein means the property of having resistance to ignition, being ignitable but allowing only a very low speed of flame spread, or being ignitable but self-distinguishing and preferably means meeting at least the V-2 ranking, particularly the V-0 ranking, according to the UL-94V standard described in Examples given later.

The flame retardant composition of the invention contains an amine (poly)phosphate. The term "amine (poly)phosphate" refers to a salt between a (poly)phosphoric acid and an amine The term "(poly)phosphoric acid" providing the amine (poly)phosphate is a generic term including monophosphoric acids and polyphosphoric acids. The monophosphoric acids are exemplified by orthophosphoric acid ($H_3PO_4$). Examples of the polyphosphoric acids include pyrophosphoric acid ($H_4P_2O_7$) (also known as diphosphoric acid), triphosphoric acid ($H_5P_3O_{10}$), and metaphosphoric acid ($HPO_3)_k$ (k stands for a positive integer) (a kind of condensed phosphoric acids).

Examples of the amine providing the amine (poly)phosphate include ammonia, alkylamines, aromatic amines, and heterocyclic amines. The amine may have a hydroxy group.

Examples of the alkylamines include monoalkylamines represented by $R_1NH_2$, dialkylamines represented by $R_1R_2NH$, trialkylamines represented by $R_1R_2R_3N$, and diamines represented by $[R^4R^5N(CH_2)_mNR^6R^7]$, wherein $R^1$, $R^2$, and $R^3$, which may be the same or different, each represent a straight or branched chain alkyl group having 1 to 8 carbon atoms; and $R^4$, $R^5$, $R^6$, and $R^7$, which may be the same or different, each represent a hydrogen atom or a straight or branched chain alkyl group having 1 to 8 carbon atoms.

Examples of the monoalkylamines include methylamine, ethylamine, propylamine, and isopropylamine. Examples of the dialkylamines include dimethylamine, dimethylethylamine, diethylamine, dipropylamine, methylpropylamine, ethylpropylamine, and ethylenediamine Examples of the trialkylamines include trimethylamine, dimethylethylamine, dimethylpropylamine, methyldiethylamine, methyldipropylamine, triethylamine, and tripropylamine Examples of the diamines represented by $[R^4R^5N(CH_2)_mNR^6R^7]$ include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-tetraethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, and 1,10-diaminodecane.

Examples of the aromatic amines include aromatic monoamines, aromatic diamines, and aromatic triamines. Examples of the aromatic monoamines include aniline Examples of the aromatic diamines include 1,2-diaminobenzene, 1,4-diaminobenzene, and 1,3-diaminobenzene. Examples of the aromatic triamines include 1,3,5-triaminobenzene.

Examples of the heterocyclic amines include those having 2 to 14 carbon atoms and at least one nitrogen atom and/or at least one of a sulfur atom and an oxygen atom, such as aliphatic heterocyclic amines with 2 to 7 carbon atoms, 5-membered aromatic heterocyclic amines with 2 to 4 carbon atoms, 6-membered aromatic heterocyclic amines with 2 to 5 carbon atoms, and polycyclic aromatic heterocyclic amines with 5 to 12 carbon atoms. Examples of the aliphatic heterocyclic compounds with 2 to 7 carbon atoms include piperidine, piperazine, morpholine, quinuclidine, pyrrolidine, azetidine, azetidin-2-one, and aziridine. Examples of the 5-membered aromatic heterocyclic compounds with 2 to 4 carbon atoms include pyrrole, imidazole, pyrazole, oxazole, isoxazole, thiazole, and isothiazole. Examples of the 6-membered aromatic heterocyclic amines with 2 to 5 carbon atoms include melamine, pyridine, pyrimidine, pyridazine, pyrazine, and 1,2,3-triazine. Examples of the polycyclic aromatic heterocyclic amines with 5 to 12 carbon atoms include quinoline, isoquinoline, quinazoline, phthalazine, indole, benzimidazole, purine, acridine, and phenothiazine.

Examples of the amines having a hydroxy group include those that are derived from any of monoalkylamines represented by $R_1NH_2$, dialkylamines represented by $R_1R_2NH$, and trialkylamines represented by $R_1R_2R_3N$ and are produced by replacing one or more hydrogen atoms of the alkyl group(s) thereof with a hydroxy group, including methanolamine, ethanolamine, dimethanolamine, diethanolamine, trimethanolamine, and triethanolamine The amine (poly)phosphate in the flame retardant composition of the invention may be derived from any combination of one or more of the (poly)phosphoric acids and one or more of the amines. When using, for example, orthophosphoric acid and pyrophosphoric acid as the (poly)phosphoric acid and piperazine and melamine as the amine, examples of such amine (poly)phosphates include piperazine orthophosphate, piperazine pyrophosphate, melamine orthophosphate, melamine pyrophosphate, a double salt formed from pyrophosphoric acid, piperazine, and melamine, and a double salt formed from orthophosphoric acid, piperazine, and melamine The amine component of the amine (poly)phosphate is preferably at least one member selected from the group consisting of ammonia, an alkylamine, an aromatic amine, a heterocyclic amine, ethanolamine, diethanolamine, and diethylenetriamine, more preferably one or more members selected from the group consisting of diethylamine, ethanolamine, diethanolamine, aniline, melamine, morpholine, ethylenediamine, piperazine, 1,2-diaminobenzene, 1,4-diaminobenzene, diethylenetriamine, methylamine, ethylamine, and dimethylamine, even more preferably melamine and piperazine.

Examples of the amine (poly)phosphates includes those represented by formula (2):

[Chem. 1]

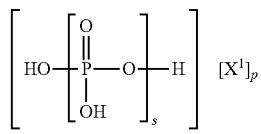

(2)

wherein s represents a number of 1 to 100; $X^1$ represents ammonia, an aromatic amine, or a triazine derivative represented by formula (3) below; and $0<p\leq s+2$.

[Chem. 2]

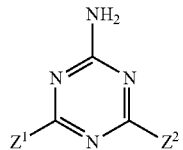

(3)

wherein $Z^1$ and $Z^2$, which may be the same or different, each represent —$NR^5R^6$ (wherein $R^5$ and $R^6$, which may be the same or different, each represent a hydrogen atom, a straight or branched chain alkyl group having 1 to 6 carbon atoms, or a methylol group), a hydroxy group, a mercapto group, a straight or branched chain alkyl group having 1 to 10 carbon atoms, a straight or branched chain alkoxy group having 1 to 10 carbon atoms, a phenyl group, or a vinyl group.

Examples of the aromatic amine represented by $X^1$ in formula (2) include aromatic monoamines, aromatic diamines, and aromatic triamines. The aromatic monoamines are exemplified by aniline. The aromatic diamines are exemplified by 1,2-diaminobenzene, 1,4-diaminobenzene, and 1,3-diaminobenzene. The aromatic triamines are exemplified by 1,3,5-triaminobenzene.

Examples of the C1-C10 straight or branched chain alkyl group represented by $Z^1$ and $Z^2$ in formula (3) include methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl, and decyl. Examples of the C1-C10 straight or branched chain alkoxy group represented by $Z^1$ and $Z^2$ include those derived from the above recited alkyl groups.

Specific examples of the triazine derivatives include melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, and 2-amino-4,6-dimercapto-1,3,5-triazine.

Examples of the amine (poly)phosphate represented by formula (2) include melamine orthophosphate, melamine pyrophosphate, and melamine polyphosphates. Preferred among them is melamine pyrophosphate in terms of flame retardation.

Other examples of the amine (poly)phosphates includes those represented by formula (4):

[Chem. 3]

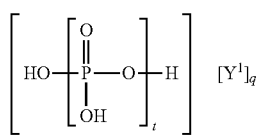

(4)

wherein t represents a number of 1 to 100; $Y^1$ represents a monoalkylamine represented by $R_1NH_2$, a dialkylamine represented by $R_1R_2NH$, a trialkylamines represented by $R_1R_2R_3N$, $[R^4R^5N(CH_2)_mNR^6R^7]$, piperazine, a diamine having a piperazine ring, diethylenetriamine, or morpholine; $R^1$, $R^2$, and $R^3$ each represent a straight or branched chain alkyl group having 1 to 5 carbon atoms; $R^4$, $R^5$, $R^6$, and $R^7$ each represent a hydrogen atom or a straight or branched chain alkyl group having 1 to 5 carbon atoms, the alkyl group being optionally substituted with a hydroxy group; $R^1$, $R^2$, $R^3$, and $R^4$ may be the same or different; m represents an integer of 1 to 10; and $0<q\leq t+2$.

Examples of the mono-, di-, and trialkylamines, derivatives thereof in which their alkyl group(s) is substituted with a hydroxy group, and the diamines represented by formula $[R^4R^5N(CH_2)_mNR^6R^7]$ include those recited above as the amine component of the amine (poly)phosphates.

Examples of the piperazine ring-containing diamines represented by $Y^1$ include trans-2,5-dimethylpiperazine, 1,4-bis(2-aminoethyl)piperazine, and 1,4-bis(3-aminopropyl)piperazine.

Examples of the amine (poly)phosphates represented by formula (4) include piperazine orthophosphate, piperazine pyrophosphate, and piperazine polyphosphates. Preferred of them is piperazine pyrophosphate in terms of flame retardation and heat resistance.

The content of the amine (poly)phosphate in the flame retardant composition of the invention is preferably 50 to 100 mass %, more preferably 80 to 100 mass %, even more preferably 90 to 100 mass %. When the amine (poly)phosphate content is less than 50 mass %, the flame retardation effect can be insufficient.

The flame retardant composition of the invention has an amine excess of 0.01 to 10 mol % as well as contains the amine (poly)phosphate. The amine excess is defined by formula (1):

[Math. 3]

$$\text{Amine excess (mol \%)} = [\Sigma(A_n \times B_n(\text{mol})) - \text{phosphorus atoms (mol) contained in flame retardant composition}]/\text{phosphorus atoms (mol) contained in flame retardant composition}) \times 100 \quad (1)$$

In formula (1), n represents the number of the kinds of the amines in the amine (poly)phosphate. When, for example, the amine of the amine (poly)phosphate is piperazine, the number of the kinds of the amines is one. When the amine (poly)phosphate is a mixture of a melamine salt and a piperazine salt or a double salt formed of a (poly)phosphoric acid, melamine, and piperazine, there are two kinds of amines: melamine and piperazine, so n=2.

$A_1$ to $A_n$ each represent the maximum number of dissociation stages of the respective amines. The maximum number of dissociation stages is defined as the maximum number of dissociation stages in which the base dissociation constant (pKb) is in the range of from 0 to 13 at 25° C. When, for example, the amine (poly)phosphate is a melamine salt, there is only one dissociation stage in which the pKb (=9.00) is within the pKb range of melamine of from 0 to 13 at 25° C. Accordingly, the maximum number of dissociation stages of melamine is one. When the amine (poly)phosphate is a piperazine salt, there are a dissociation stage in which pKb=4.18 and a dissociation stage in which pKb=8.32 within the pKb range of 0 to 13 of piperazine at 25° C. Accordingly, the maximum number of dissociation stages of piperazine is two.

$B_1$ to $B_n$ each represent the number of moles of the respective amines of the amine (poly)phosphate when the amine is assumed to be present alone. When, for example, the amine (poly)phosphate is a mixture of a melamine salt and a piperazine salt or a double salt formed of a (poly)

phosphoric acid, melamine, and piperazine, n is two. In this case, $B_1$ is the number of moles of melamine being assumed to be present alone, and $B_2$ is the number of moles of piperazine assumed to be present alone.

The list below describes representative amines and their pKb values at 25° C. and the dissociation stage(s) and the maximum number of the dissociation stages in which the pKb at 25° C. is in the range of 0 to 13. Where the amine has a plurality of dissociation stages, the one with the least pKb value is taken as a first (dissociation) stage, and the others with increasing pKb values are numbered in increasing order from the second to the nth.

Ammonia (pKb of first stage: 4.64; max. number of stages: 1)
Diethylamine (pKb of first stage: 2.98; max. number of stages: 1)
Ethanolamine (pKb of first stage: 4.36; max. number of stages: 1)
Diethanolamine (pKb of first stage: 5.13; max. number of stages: 1)
Aniline (pKb of first stage: 9.37; max. number of stages: 1)
Melamine (pKb of first stage: 9.00; max. number of stages: 1)
Morpholine (pKb of first stage: 5.5; max. number of stages: 1)
Ethylenediamine (pKb of first stage: 4.08; pKb of second stage: 6.88; max. number of stages: 2)
Piperazine (pKb of first stage: 4.18; pKb of second stage: 8.32; max. number of stages: 2)
1,2-Diaminobenzene (pKb of first stage: 9.30; pKb of second stage: 13.47; max. number of stages: 1)
1,4-Diaminobenzene (pKb of first stage: 8.00; pKb of second stage: 11.27; max. number of stages: 2)
Diethylenetriamine (pKb of first stage: 4.15; pKb of second stage: 4.94; pKb of third stage: 9.69; max. number of stages: 3)

The phosphorus atoms contained in the flame retardant composition as referred to in formula (1) include not only those present in the amine (poly)phosphate but also those contained in any additive hereinafter described. The number of moles of the phosphorus atoms contained in the flame retardant composition of the invention is measured by ICP-OES, ion chromatography, XRF, NMR, and the like.

The amine excess represents the ratio of the number of moles of the amino groups that remain unreacted with the (poly)phosphoric acid in the flame retardant composition containing the amine (poly)phosphate to the number of moles of the phosphorus atoms contained in the flame retardant composition. When the number of moles of the amino groups exceeds the stoichiometric amount for the reaction with the (poly)phosphoric acid with respect to the number of moles of phosphorus atoms, the amine excess exceeds 0.00 mol %. When the number of moles of phosphorus atoms exceeds the stoichiometric amount for the reaction with the amine with respect to the number of mole of amino groups, the amine excess is less than 0.00 mol %.

It has been believed that a flame retardant composition containing an amine (poly)phosphate with a large amount of an unreacted (poly)phosphoric acid or amine adversely affects the performance properties of a synthetic resin to which it is added. It has therefore been a practice usually followed to adjust the compounding ratio between a (poly) phosphoric acid and an amine to be stoichiometric, namely, adjust the amine excess so as to be 0.00 mol %. In other words, in the conventional preparation of a flame retardant composition, it has not been practiced to adjust the molar ratio of the amine to phosphorus atoms such that the number of moles of the amine exceeds the stoichiometric amount for the reaction with a (poly)phosphoric acid with respect to the number of moles of phosphorus atoms, i.e., adjust the amine excess so as to exceed 0.00 mol %, or to adjust the molar ratio of phosphorus atoms to the amine such that the number of moles of phosphorus atoms exceeds the stoichiometric amount for the reaction with an amine with respect to the number of moles of the amine, i.e., adjust the amine excess so as to be lower than 0.00 mol %.

Under the above circumstances, the inventors have found that a flame retardant composition containing an amine (poly)phosphate that meets all the demands for hydrolysis resistance, weatherability, and flame retardancy is obtained by adjusting the amine excess within the above specified range. If the amine excess is less than 0.01 mol % or more than 10 mol %, at least one of hydrolysis resistance, weatherability, and flame retardancy will reduce. In order to further improve all of hydrolysis resistance, weatherability, and flame retardancy, the amine excess is preferably 0.1 mol % or more and less than 10 mol %, more preferably 1.0 mol % or more and less than 10 mol %, even more preferably 2.2 mol % or more and less than 10 mol %, still more preferably 2.4 mol % or more and less than 10 mol %, yet more preferably 2.9 mol % or more and less than 10 mol %.

Suitable methods for setting the amine excess of the flame retardant composition within the above range include methods (1) and (2) below.

Method (1):
To an aqueous solution of a (poly)phosphoric acid is added an amine of an amount calculated to give an amine excess falling within the above range to carry out neutralization reaction. Water is removed by evaporation to yield an intended amine (poly)phosphate.

Method (2):
To an amine (poly)phosphate having an amine excess out of the above range is added an amine of an amount calculated to result in an amine excess within the above range, followed by allowing to react to give an intended amine (poly)phosphate.

The (poly)phosphoric acid aqueous solution used in method (1) may be prepared by, for example, salt exchange of a (poly)phosphoric acid salt, e.g., sodium (poly)phosphate, using a cation exchange resin (hereinafter, "method (3)") or hydrolysis of diphosphorus pentoxide (hereinafter, "method (4)").

In method (3), the salt exchange of sodium (poly)phosphate using a cation exchange resin is preferably repeated at least twice so as to increase the purity of the resulting (poly)phosphoric acid.

The amine excess is calculated by obtaining the total number of moles of the amino group as represented by $\Sigma(A_n \times B_n)$ (mol) and the total number of moles of the phosphorus atoms contained in the flame retardant composition and substituting these values into formula (1).

The flame retardant composition of the invention may further contain an amine compound in addition to the amine (poly)phosphate. Examples of the amine compound include those described above as the amine component of the amine (poly)phosphate and, in addition, amine-containing compounds described below as an additive.

In the case where the flame retardant composition contains an amine compound in addition to the amine (poly) phosphate, it is preferred that the amine excess represented by formula (1) be in the above specified range. In that case, n in formula (1) represents the total of the number of the kinds of amines in the amine (poly)phosphate and the number of the kinds of the amine compounds. For example, when the flame retardant composition contains a melamine salt and a piperazine salt as the amine (poly)phosphate and further contains ammonia and ethanolamine as the amine compound, the number of the kinds of amines in the amine (poly)phosphate is 2, and the number of the kinds of amine compounds is 2; therefore, n is 4.

When the flame retardant composition contains a melamine salt and a piperazine salt as the amine (poly)phosphate and further contains melamine and piperazine as the amine compound, the number of the kinds of amines is 2.

$A_1$ to $A_n$ are obtained from the maximum number of dissociation stages of each amine in the amine (poly) phosphate and the maximum number of dissociation stages of each amine compound.

$B_1$ to $B_n$ each represent the number of moles of respective amines when the amine is assumed to be present independently in the amine (poly)phosphate or the number of moles of the respective amine compounds. For example, when the amine (poly)phosphate composed of a melamine salt plus a piperazine salt is used in combination with ammonia and ethanolamine as an amine compound, n is 4. Therefore, $B_1$ is the number of moles of melamine being assumed to be present alone, $B_2$ is the number of moles of piperazine being assumed to be present alone, $B_3$ is the number of moles of ammonia as an amine compound, and $B_4$ is the number of moles of ethanolamine as another amine compound.

It is preferred in terms of flame retardancy for the flame retardant composition of the invention that the amine (poly) phosphate include an amine pyrophosphate and that the ratio of pyrophosphoric acid to the total (poly)phosphoric acids in the amine (poly)phosphate be 80 to 99.99 mass %, preferably 90 to 99.99 mass %, more preferably 95 to 99.99 mass %. It is also preferred in terms of thermal stability, flame retardancy, and processability that the amine (poly)phosphate include an amine orthophosphate and that the ratio of orthophosphoric acid to the total (poly)phosphoric acids in the amine (poly)phosphate be 5 mass % or lower, preferably 3 mass % or lower, more preferably 1 mass % or lower. There is no particular lower limit to the ratio of orthophosphoric acid to the total (poly)phosphoric acids in the amine (poly)phosphate; the closer to zero, the more preferred.

The ratio of pyrophosphoric acid to the total (poly) phosphoric acids in the amine (poly)phosphate contained in the flame retardant composition of the invention may suitably be controlled within the above range by, for example, the following technique.

Method (1) described above for setting the amine excess within the specific range is followed, and in method (1) the polyphosphoric acid aqueous solution is prepared through method (3). Method (3) is carried out starting with a (poly)phosphoric aid having the ratio of pyrophosphoric acid to the total (poly)phosphoric acids falling within the above range in the preparation of the (poly)phosphoric acid salt, e.g., sodium (poly)phosphate. Such a (poly)phosphoric acid having a ratio of pyrophosphoric acid to the total (poly)phosphoric acids within the above range is prepared by, for example, heat dehydration condensation of orthophosphoric acid under a temperature condition such that the amount of orthophosphoric acid remaining unreacted may be as small as possible and also that the condensation of orthophosphoric acid may not proceed excessively so that the condensation product may remain being pyrophosphoric acid.

The ratio of orthophosphoric acid to the total (poly) phosphoric acids in the amine (poly)phosphate contained in the flame retardant composition of the invention may be controlled within the above range by, for example, the same technique as used to control the ratio of pyrophosphoric acid to the total (poly)phosphoric acids in the amine (poly) phosphate within the specified range, except for using a (poly)phosphoric acid having the ratio of orthophosphoric acid to the total (poly)phosphoric acids within the above range.

A (poly)phosphoric acid having the ratio of orthophosphoric acid to the total (poly)phosphoric acids within the above range may be prepared by, for example, heat dehydration condensation of orthophosphoric acid under a temperature condition such that the amount of orthophosphoric acid remaining unreacted may fall within the above range.

The ratios of pyrophosphoric acid and orthophosphoric acid to the total (poly)phosphoric acids in the amine (poly) phosphate contained in the flame retardant composition of the invention are determined by, for example, ion chromatography.

The flame retardant composition of the invention may contain a flame retardant other than the amine (poly)phosphate and an additive that can be use in flame-retardant synthetic resin compositions as will hereinafter be described. Examples of flame retardants other than the amine (poly)phosphate include nitrogen-containing flame retardants, such as melamine cyanurate, metal hydroxides, such as magnesium hydroxide and aluminum hydroxide, phosphinate or diphosphinate flame retardants, phosphonate flame retardants, and phosphoric ester flame retardants.

The flame retardant composition of the invention is suited to be incorporated into various synthetic resins to provide flame-retardant synthetic resin compositions that are useful in a variety of applications.

The flame-retardant synthetic resin composition according to the invention contains the flame retardant composition of the invention. The content of the flame retardant composition in the flame-retardant synthetic resin composition is preferably 10 to 400 parts by mass, more preferably 20 to 70 parts by mass, per 100 parts by mass of the synthetic resin. When the content of the flame retardant composition is 10 parts or more, the resin composition exhibits improved flame retardancy. When the content of the flame retardant composition is not more than 400 parts, the processability of the resin is less likely to be impaired.

Examples of the synthetic resin include thermoplastic resins, such as polyolefin resins, polyester resins, vinyl resins, polycarbonate resins, acrylic resins, styrene resins, polyamide resins, polyphenylene oxide resins, and polyphenylene sulfide resins. These synthetic resins may be used either singly or in combination thereof. The synthetic resins may be alloyed resins.

The synthetic resin preferably has a melt flow rate (MFR) of 2.0 to 80 g/10 min, more preferably 8.0 to 60 g/10 min, as measured at 230° C. and a 2.16 kg load in accordance with JIS K7210, in view of processability and flame retardancy.

Examples of the polyolefin resins include α-olefin polymers, such as polyethylene, low density polyethylene, linear low density polyethylene, high density polyethylene, polypropylene, homopolypropylene, random copolymer polypropylene, block copolymer polypropylene, impact copolymer polypropylene, high impact copolymer polypropylene, isotactic polypropylene, syndiotactic polypropylene, hemisotactic polypropylene, maleic anhydride-modified polypropylene, polybutene, cycloolefin polymers, stereoblock polypropylene, poly-3-methyl-1-butene, poly-3-methyl-1-pentene, and poly-4-methyl-1-pentene; and α-olefin copolymers, such as ethylene/propylene block or random copolymers, ethylene/methyl methacrylate copolymers, and ethylene/vinyl acetate copolymers.

Examples of the polyester resins include saturated polyester resins obtained by using a diacid, e.g., terephthalic acid, or a derivative thereof capable of forming an ester as an acid component and a C2-C10 glycol or other dihydric alcohols or a derivative thereof capable of forming an ester as a glycol component. Preferred of them are polyalkylene terephthalates in view of their well-balanced properties, such as processability, mechanical characteristics, electrical properties, and heat resistance. Examples of the polyalkylene terephthalates include polyethylene terephthalate, polybutylene terephthalate, and polycyclohexanedimethylene terephthalate.

Examples of the vinyl resins include homopolymers of vinyl monomers, such as vinyl esters (e.g., vinyl acetate), chlorine-containing vinyl compounds (e.g., vinyl chloride), vinyl ketones, vinyl ethers, and vinylamines (e.g., N-vinylcarbazole), or copolymers composed of two or more of these vinyl monomers; and copolymers of the vinyl monomers and other copolymerizable monomers. Derivatives of the vinyl resins, such as polyvinyl alcohol, polyvinyl acetals (e.g., polyvinyl formal and polyvinyl butyral), and ethylene-vinyl acetate copolymers, are also useful.

Examples of the polycarbonate resins include those obtained by the reaction between at least one bisphenol and phosgene or a carbonic acid diester and those obtained by interesterification between at least one bisphenol and a diphenyl carbonate. Examples of the bisphenol include hydroquinone, 4,4-dihydroxyphenyl, bis(4-hydroxyphenyl) alkanes, bis(4-hydroxyphenyl)cycloalkanes, bis(4-hydroxyphenyl) sulfide, bis(4-hydroxyphenyl) ether, bis(4-hydroxyphenyl) ketone, bis(4-hydroxyphenyl) sulfone, bisphenol fluorene, and their alkyl-, aryl-, or halogen-substituted derivatives. These polycarbonate resins may be used either singly or in combination of two or more thereof.

The polycarbonate resin may be used in the form of a polymer alloy obtained by blending the polycarbonate resin with other resins. Examples of such a polymer alloy include polycarbonate/ABS resin, polycarbonate/AS resin, polycarbonate/rubber polymer, polycarbonate/ABS resin/rubber polymer, polycarbonate/polyethylene terephthalate, polycarbonate/polybutylene terephthalate, polycarbonate/ASA resin, and polycarbonate/AES resin. The proportion of the polycarbonate resin in the polymer alloy is preferably 50 to 98 mass %.

Examples of the acrylic resins include polymers composed mainly of a (meth)acrylic ester, such as methyl (meth)acrylate, ethyl (meth)acrylate, butyl (meth)acrylate, or 2-ethylhexyl (meth)acrylate. The acrylic resin may be a homopolymer of such a (meth)acrylic ester or a copolymer of at least 50 mass % of the (meth)acrylic ester and at most 50 mass % of a copolymerizable monomer. Examples of the copolymerizable monomer include monofunctional monomers, such as aromatic alkenyl compounds (e.g., styrene, α-methylstyrene, and vinyltoluene), alkenyl cyanides (e.g., acrylonitrile and methacrylonitrile), unsaturated carboxylic acids (e.g., acrylic acid and methacrylic acid), maleic anhydride, and N-substituted maleimide; and polyfunctional monomers, such as polyhydric alcohol esters of polyunsaturated carboxylic acids (e.g., ethylene glycol dimethacrylate, butanediol dimethacrylate, and trimethylolpropane triacrylate), alkenyl esters of unsaturated carboxylic acids (e.g., allyl acrylate, allyl methacrylate, and allyl cinnamate), polyalkenyl esters of polybasic acids (e.g., diallyl phthalate, diallyl maleate, triallyl cyanurate, and triallyl isocyanurate), and aromatic polyalkenyl compounds (e.g., divinylbenzene).

Examples of the styrene resins include homo- and copolymers of styrene monomers (e.g., styrene and vinyltoluene); copolymers of a styrene monomer and a vinyl monomer, such as a (meth)acrylic monomer (e.g., (meth) acrylonitrile, (meth)acrylic esters, and (meth)acrylic acid), an α,β-monoolefinically unsaturated carboxylic acid or its anhydride or ester (e.g., maleic anhydride); styrene graft copolymers; and styrene block copolymers.

Examples of the polyamide resins include aliphatic polyamides, such as polyamide 46, polyamide 6, polyamide 66, polyamide 610, polyamide 612, polyamide 11, and polyamide 12; alicyclic polyamides obtained from alicyclic diamines (e.g., bis(aminocyclohexyl) C1-C3 alkanes) and aliphatic dicarboxylic acids (e.g., C8-C14 alkanedicarboxylic acids); polyamides obtained from aromatic dicarboxylic acids (e.g., terephthalic acid and/or isophthalic acid) and aliphatic diamines (e.g., hexamethylenediamine and nonamethylenediamine); and polyamides obtained from aromatic and aliphatic dicarboxylic acids (e.g., terephthalic acid and adipic acid) and aliphatic diamines (e.g., hexamethylenediamine)

Examples of the polyphenylene oxide resins include homopolymers, such as poly(mono-, di- or tri-(C1-C6 alkyl) phenylene)) oxides (e.g., poly(2,6-dimethyl-1,4-phenylene) oxide, poly(2,5-dimethyl-1,4-phenylene) oxide, and poly(2,5-diethyl-1,4-phenylene) oxide), poly(mono- or di-(C6-C20 aryl)-phenylene)) oxides, and poly(mono(C1-C6 alkyl)-mono(C6-C29 aryl)-phenylene) oxides; random copolymers having a 2,6-dimethyl-1,4-phenylene oxide unit and a 2,3,6-trimethyl-1,4-phenylene oxide unit; modified polyphenylene oxide copolymers composed of (i) an alkylphenol-modified benzene-formaldehyde resin block obtained by the reaction between a benzene-formaldehyde resin (e.g., phenol resin) or an alkylbenzene-formaldehyde resin and an alkylphenol (e.g., cresol) and, as a main structure, (ii) a polyphenylene oxide block; and modified graft copolymers composed of polyphenylene oxide or a copolymer thereof having a styrene polymer and/or an unsaturated carboxylic acid or an anhydride thereof (e.g., (meth)acrylic acid or maleic anhydride) grafted thereto.

Examples of the polyphenylene sulfide resins include homopolymers and copolymers having a phenylene sulfide structure —(Ar—S)—, wherein Ar is a phenylene group. Examples of the phenylene group —Ar— include p-, m-, or o-phenylene group, a substituted phenylene group (e.g., an alkylphenylene group having, e.g., a C1-C6 alkyl group as a substituent or an arylphenylene group having, e.g., a phenyl group as a substituent), and —Ar-$A^1$-Ar—, wherein Ar is a phenylene group; and $A^1$ is a direct bond, O, CO, or $SO_2$.

If desired, the flame-retardant synthetic resin composition of the invention may contain a phenol antioxidant, a phosphorus antioxidant, a light stabilizer, a thioether antioxidant, other antioxidants, a nucleating agent, an ultraviolet absorber, a flame retardant synergist, a lubricant, a filler, a hydrotalcite compound, an aliphatic metal salt, a dye, and so forth, provided that the amine excess is in the above range. These additive components may previously be incorporated into the flame retardant composition of the invention or be added in the preparation of the flame-retardant synthetic resin composition. These additives are advantageously used to stabilize the synthetic resin.

Examples of the phenol antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene bis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl (3,5-di-tert-butyl-4-hydroxyphenyl)propionate, tetrakis[methylene-3-(3,5-di-tert-butyl-4-hydroxyphenyl)propionate]methane, thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5,5]undecane, and triethylene glycol bis[(3-tert-butyl-4-hydroxy-5-methylphenyl)propionate]. Preferred of them is tetrakis[methylene-3-(3,5-di-tert-butyl-4-hydroxyphenyl)propionate]methane in terms of resin stabilizing effect. The phenol antioxidant content in the flame-retardant synthetic resin composition is preferably 0.001 to 5 mass %, more preferably 0.01 to 1 mass %.

Examples of the phosphorus antioxidant include trisnonylphenyl phosphite, tris[2-tert-butyl-4-(3-tert-butyl-4-hydroxy-5-methylphenylthio)-5-methylphenyl]phosphite, tris (2,4-di-tert-butylphenyl) phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetratridecyl isopropylidenediphenol diphosphite, tetratridecyl 4,4'-n-butylidenebis(2-tert-butyl-5-methylphenol) diphosphite, hexatridecyl 1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene 10-oxide, 2,2'-methylenebis(4,6-di-tert-butylphenyl)-2-ethylhexyl phosphite, 2,2'-methylenebis(4,6-di-tert-butylphenyl)octadecyl phosphite, 2,2'-ethylidenebis(4,6-di-tert-butylphenyl) fluorophosphite, tris (2-[(2,4,8,10-tetrakis-tert-butyldibenzo[d,f][1,3,2] dioxaphosphepin-6-yl)oxy]ethyl)amine, a phosphite of 2-ethyl-2-butylpropylene glycol and 2,4,6-tri-tert-butylphenol. Preferred of them is tris(2,4-di-tert-butylphenyl) phosphite in terms of resin stabilizing effect. The phosphorus antioxidant content of the flame-retardant synthetic resin composition is preferably 0.001 to 5 mass %, more preferably 0.01 to 1 mass %.

Examples of the light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis (2,2,6,6-tetramethyl-4-piperidyl) sebacate, bis(1,2,2,6,6-tetramethyl-4-piperidyl) sebacate, bis(1-oxtoxy-2,2,6,6-tetramethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)di (tridecyl) 1,2,3,4-butanetetracarboxylate, bis(1,2,2,6,6-pentamethyl-4-piperidyl)bis(tridecyl) 1,2,3,4-butanetetracarboxylate, bis(1,2,2,6,6-pentamethyl-4-piperizyl) 2-butyl-2-(3,5-di-tert-butyl-4-hydroxybenzyl) malonate, 1-(2-hydroxyethyl)-2,2,6,6-tetramethyl-4-piperidinol/diethyl succinate polycondensates, 1,6-bis(2,2,6, 6-tetramethyl-4-piperidylamino)hexane/2,4-dichloro-6-morpholino-s-triazin e polycondensates, 1,6-bis(2,2,6,6-tetramethyl-4-piperidylamino)hexane/dibromoethane polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino) hexane/2,4-dichloro-6-tert-octylaminos-triazine polycondensates, 1,5,8,12-tetrakis[2,4-bis(N-butyl-N-(2,2, 6,6-tetramethyl-4-piperidyl)amino)-s-triazin-6-yl]-1,5,8,12-tetraazadodecane, 1,5,8,12-tetrakis[2,4-bis(N-butyl-N-(1,2, 2,6,6-pentamethyl-4-piperidyl)amino)-s-triazin-6-yl]-1,5,8, 12-tetraazadodecane, 1,6,11-tris[2,4-bis(N-butyl-N-(2,2,6, 6-tetramethyl-4-piperidyl)amino)-s-triazin-6-yl] aminoundecane, 1,6,11-tris[2,4-bis(N-butyl-N-(1,2,2,6,6-pentamethyl-4-piperidyl)amino)-s-triazin-6-yl] aminoundecane, 3,9-bis[1,1-dimethyl-2-{tris(2,2,6,6-tetramethyl-4-piperidyloxycarbonyl) butylcarbonyloxy}ethyl]-2,4,8,10-tetraoxaspiro[5.5] undecane, 3,9-bis[1,1-dimethyl-2-{tris(1,2,2,6,6-pentamethyl-4-piperidyloxycarbonyl) butylcarbonyloxy}ethyl]-2,4,8,10-tetraoxaspiro[5.5] undecane, and bis(1-undecyloxy-2,2,6,6-tetramethylpiperizin-4-yl) carbonate. Commercially available products, such as ADK STAB LA-402 and ADK STAB LA-502 both available from Adeka Corp. are useful. Preferred of these light stabilizers is ADK STAB LA-502. The light stabilizer content of the flame-retardant resin composition is preferably 0.001 to 5 mass %, more preferably 0.005 to 0.5 mass %.

The flame-retardant synthetic resin composition of the invention may optionally contain a crystal nucleating agent in an amount that does not affect the effects of the invention. Any crystal nucleating agents commonly employed for polymers may be used as appropriate. In the invention, either of an inorganic crystal nucleating agent and an organic crystal nucleating agent may be used.

Examples of the inorganic crystal nucleating agent include kaolinite, synthetic mica, clay, zeolite, silica, graphite, carbon black, and metal salts, such as magnesium oxide, titanium oxide, calcium sulfide, boron nitride, calcium carbonate, barium sulfate, aluminum oxide, neodymium oxide, and phenyl phosphonate. The inorganic crystal nucleating agent may be modified with an organic substance so as to have improved dispersibility in the composition.

Examples of the organic nucleating agent include metal salts of organic carboxylic acids, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonic acid salts, such as sodium p-toluenesulfonate and sodium sulfoisophthalate; carboxylic amides, such as stearamide, ethylenebislauramide, palmitamide, hydroxystearamide, erucamide, and trimesic acid tris(tert-butyramide); benzylidenesorbitol and its derivatives, metal salts of phosphorus compounds, such as sodium 2,2'-methylenebis(4,6-di-tert-butylphenyl)phosphate; and sodium 2,2-methylbis(4,6-di-tert-butylphenyl).

The flame-retardant synthetic resin composition of the invention may contain a lubricant in an amount that does not affect the effects of the invention. Examples of useful lubricants include pure hydrocarbon lubricants, such as liquid paraffins, natural paraffins, microwaxes, synthetic paraffins, low-molecular polyethylenes, and polyethylene waxes; halogenated hydrocarbon lubricants; fatty acid lubricants, such as higher fatty acids and oxy fatty acids; fatty acid amide lubricants, such as fatty acid amides and bis-fatty acid amides; ester lubricants, such as lower alcohol esters of fatty acids, polyhydric alcohol esters of fatty acids (e.g., glycerides), polyglycol esters of fatty acids, and fatty alcohol esters of fatty acids (ester waxes); metal soaps; fatty alcohols; polyhydric alcohols; polyglycols; polyglycerols; partial esters of fatty acids and polyhydric alcohols; partial esters of fatty acids and polyglycol or polyglycerol; silicone oils; and mineral oils. These lubricants may be used in combination of two or more thereof. The lubricant content of the flame-retardant synthetic resin composition is preferably 0.01 to 10 mass %, more preferably 0.05 to 3 mass %.

The flame-retardant synthetic resin composition of the invention may optionally contain a plasticizer in an amount that the does not impair the effects of the invention. Any plasticizers that are commonly used for polymers may be used as appropriate, including polyester plasticizers, glycerol plasticizers, polycarboxylic ester plasticizers, polyalkylene glycol plasticizers, and epoxy plasticizers.

If desired, the flame-retardant synthetic resin composition of the invention may contain additives commonly used for thermoplastic resins in amounts that do not impair the effects of the invention. Useful additives include crosslinking agents, antistatics, metal soaps, fillers, antifogging agents, anti-plate-out agents, surface treating agents, fluorescent agents, antifungals, bactericides, foaming agents, metal inactivators, parting agents, pigments, processing aids other than acrylic processing aids, and so forth.

The flame-retardant synthetic resin composition of the invention may be prepared by compounding a synthetic resin with the flame retardant composition of the invention and, if desired, other optional components using various mixing machines with or without heating. Examples of suitable mixing machines include a tumbler mixer, a Henschel mixer, a ribbon blender, a V-blender, a W-blender, a super mixer, and a Nauta mixer.

The flame-retardant synthetic resin composition of the invention can be molded to provide molded articles having high flame retardancy. Molding may be carried out by any methods, including extrusion, calendering, injection molding, rolling, compression molding, and blow molding, to give molded articles of various shapes, such as plates, sheets, films, and irregular shapes.

The flame-retardant synthetic resin composition of the invention and molded articles obtained therefrom are applicable to housings (frames, cases, covers, and enclosures) and parts of electric vehicles, machinery, electric and electronic equipment, and OA equipment; and automotive interior and exterior materials.

The flame-retardant synthetic resin composition of the invention and its molded articles find wide applications in various industrial fields, including electric & electronics, communications, agriculture, forestry, fisheries, mining, construction, foods, fibers, clothing, remedy, coal, petroleum, rubber, leather, automobiles, precision equipment, lumber, building materials, civil engineering, furniture, printing, musical instruments, and so on. Specifically, the applications include housings (frames, cases, covers, and enclosures) and parts of stationery and OA equipment (such as printers, personal computers, word processors, keyboards, PDAs (personal digital assistants), telephone sets, copiers, fax machines, ECRs (electronic cash registers), calculators, electronic diaries, cards, holders, and writing tools), household electric appliances (such as laundry machines, refrigerators, vacuum cleaners, microwave ovens, lighting equipment, game machines, irons, and kotatsu), audio and visual equipment (such as TV sets, VTRs, camcorders, radio-cassette recorders, tape recorders, mini discs, CD players, speakers, and liquid crystal displays), electric and electronic components and communication equipment (such as connectors, relays, capacitors, switches, printed circuit boards, coil bobbins, semiconductor sealants, LED sealants, electric wires, cables, transformers, deflection yokes, distribution boards, and clocks); and automotive interior and exterior materials.

The flame-retardant synthetic resin composition of the invention and its molded articles also find use as materials for gas (petrol) vehicles, hybrid vehicles, electrical vehicles, train cars, boats, ships, aircrafts, buildings, and houses, such as seats (stuffing and upholstery), belts, ceiling covering, convertible tops, arm rests, door trims, rear package trays, carpets, rugs, mats, sun visors, wheel covers, mattress covers, air bags, insulating materials, assist grips, assist straps, wire covering, electrical insulators, paints, coatings, overlays, flooring, inside corner moldings, carpet, wallpaper, wall covering, exterior covering, interior covering, roofing, decks, walls, pillars, floor plates, fences, frames and moldings, profiles for windows and doors, roof shingles, siding boards, terraces, balconies, soundproofing boards, heat insulating boards, and window boards; civil engineering materials; and housewares and sporting equipment, such as clothing, curtains, bed sheets, chip boards, fiber boards, carpets and rugs, doormats, sheets, buckets, hoses, containers, glasses, bags, cases, goggles, skis, rackets, tents, and musical instruments.

EXAMPLES

The invention will now be illustrated in greater detail with reference to Examples, but the invention is not deemed to be limited thereto. Unless otherwise noted, all the parts and percents are by mass.

The ratios of orthophosphoric acid and pyrophosphoric acid to the total (poly)phosphoric acids of the amine (poly)phosphate were quantitatively determined from the area ratios (%) in ion chromatograph analysis conducted under the following conditions:
Ion chromatograph: ICS-2100 from Dionex Corp.
Column: Dionex IonPac AS19 (4×250 mm)
Eluent: potassium hydroxide aqueous solution Example 1

In a 500 ml beaker were put 250 ml of ultrapure water and 250 ml of a cation exchange resin (SK1BH from Mitsubishi Chemical Corp.; 2.0 meq/ml) and cooled to or below 1° C. in an ice bath. To the cooled mixture was added 5.0 g (18.8 mmol) of sodium pyrophosphate. After stirring the resulting solution for 2 hours, the cation exchange resin was removed by filtration. To complete sodium ion exchange, the filtrate solution was passed through a column packed with 50 ml of the same cation exchange resin. The solution remaining in the column was effused by passing 500 ml of ultrapure water, and the effluent was combined with the previous effluent to give a pyrophosphoric acid aqueous solution. To the pyrophosphoric acid aqueous solution were added 1.22 g (14.2 mmol) of piperazine, 1.41 g (11.2 mmol) of melamine, and 250 ml of water, and the mixture was stirred for 3 hours. Water was completely removed using a rotary evaporator under reduced pressure at or below 30° C. to yield an amine (poly)phosphate, i.e., a flame retardant composition. The amine (poly)phosphate of the flame retardant composition contained melamine and piperazine as an amine component. The flame retardant composition had an amine excess of 4.8 mol %. The ratios of orthophosphoric acid and pyrophosphoric acid to the total (poly)phosphoric acids of the amine (poly)phosphate were 0.2% and 97.7%, respectively.

Example 2

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.54 g (41.1 mmol) of piperazine, 4.22 g (33.5 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component. The flame retardant composition had an amine excess of 2.3 mol %. The ratios of orthophosphoric acid and pyrophosphoric acid to the total (poly)phosphoric acids of the amine (poly)phosphate were 0.2% and 97.7%, respectively.

Example 3

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g of sodium tripolyphosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a tripolyphosphoric acid aqueous solution. To the tripolyphosphoric acid aqueous solution were added 3.80 g (44.1 mmol) of piperazine, 4.53 g (35.9 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component. The flame retardant composition had an amine excess of 2.9 mol %. The ratios of orthophosphoric acid and pyrophosphoric acid to the total (poly)phosphoric acids of the amine (poly)phosphate were 0.3% and 13.7%, respectively.

Example 4

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture were added 0.60 g (5.2 mmol) of a 85% aqueous solution of orthophosphoric acid and 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a mixed aqueous solution of orthophosphoric acid and pyrophosphoric acid. To the mixed aqueous solution were added 3.80 g (44.1 mmol) of piperazine, 4.53 g (35.9 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component and orthophosphoric acid and pyrophosphoric acid as a (poly)phosphoric acid component. The flame retardant composition had an amine excess of 5.0 mol %. The ratios of orthophosphoric acid and pyrophosphoric acid to the total (poly)phosphoric acids of the amine (poly)phosphate were 5.0% and 94.1%, respectively.

Example 5

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.80 g (44.1 mmol) of piperazine, 4.53 g (35.9 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component. The flame retardant composition had an amine excess of 9.8 mol %. The ratios of orthophosphoric acid and pyrophosphoric acid to the total (poly)phosphoric acids of the amine (poly)phosphate were 0.7% and 97.7%, respectively.

Example 6

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.30 g (38.3 mmol) of piperazine, 4.22 g (33.5 mmol) of melamine, 1.00 g (5.9 mmol) of 10% aqueous ammonia, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and ammonia as an amine component. The flame retardant composition had an amine excess of 2.5 mol %. The ratios of orthophosphoric acid and pyrophosphoric acid to the total (poly)phosphoric acids of the amine (poly)phosphate were 0.8% and 97.9%, respectively.

Example 7

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.30 g (38.3 mmol) of piperazine, 4.22 g (33.5 mmol) of melamine, 0.50 g (6.4 mmol) of a 40% aqueous solution of methylamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and methylamine as an amine component. The flame retardant composition had an amine excess of 3.0 mol %. The ratios of orthophosphoric acid and pyrophosphoric acid to the total (poly)phosphoric acids of the amine (poly)phosphate were 0.8% and 98.0%, respectively.

Example 8

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.30 g (38.3 mmol) of piperazine, 4.22 g (33.5 mmol) of melamine, 0.30 g (6.7 mmol) of ethylamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and ethylamine as an amine component. The flame retardant composition had an amine excess of 3.2 mol %. The ratios of orthophosphoric acid and pyrophosphoric acid to the total (poly)phosphoric acids of the amine (poly)phosphate were 0.6% and 98.0%, respectively.

Example 9

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.10 g (36.0 mmol) of piperazine, 4.30 g (34.1 mmol) of melamine, 0.50 g (11.1 mmol) of dimethylamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and dimethylamine as an amine component. The flame retardant composition had an amine excess of 3.6 mol %. The ratios of orthophosphoric acid and pyrophosphoric acid to the total (poly)phosphoric acids of the amine (poly)phosphate were 0.6% and 98.2%, respectively.

Example 10

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.40 g (39.5 mmol) of piperazine, 4.22 g (33.5 mmol) of melamine, 0.30 g (4.1 mmol) of diethylamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and diethylamine as an amine component. The flame retardant composition had an amine excess of 3.0 mol %. The ratios of orthophosphoric acid and pyrophosphoric acid to the total (poly)phosphoric acids of the amine (poly) phosphate were 0.8% and 98.0%, respectively.

Example 11

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.40 g (39.5 mmol) of piperazine, 4.22 g (33.5 mmol) of melamine, 0.30 g (4.9 mmol) of ethanolamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and ethanolamine as an amine component. The flame retardant composition had an amine excess of 3.7 mol %. The ratios of orthophosphoric acid and pyrophosphoric acid to the total (poly)phosphoric acids of the amine (poly) phosphate were 0.8% and 97.9%, respectively.

Example 12

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.40 g (39.5 mmol) of piperazine, 4.22 g (33.5 mmol) of melamine, 0.30 g (2.9 mmol) of diethanolamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and diethanolamine as an amine component. The flame retardant composition had an amine excess of 1.9 mol %. The ratios of orthophosphoric acid and pyrophosphoric acid to the total (poly)phosphoric acids of the amine (poly) phosphate were 0.8% and 97.9%, respectively.

Example 13

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.40 g (39.5 mmol) of piperazine, 4.22 g (33.5 mmol) of melamine, 0.40 g (4.6 mmol) of morpholine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and morpholine as an amine component. The flame retardant composition had an amine excess of 3.5 mol %. The ratios of orthophosphoric acid and pyrophosphoric acid to the total (poly)phosphoric acids of the amine (poly) phosphate were 0.4% and 98.1%, respectively.

Example 14

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 1.52 g (17.7 mmol) of piperazine, 4.22 g (33.5 mmol) of melamine, 1.50 g (25.0 mmol) of ethylenediamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and ethylenediamine as an amine component. The flame retardant composition had an amine excess of 4.9 mol %. The ratios of orthophosphoric acid and pyrophosphoric acid to the total (poly)phosphoric acids of the amine (poly) phosphate were 1.0% and 97.8%, respectively.

Example 15

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.10 g (36.0 mmol) of piperazine, 4.20 g (33.3 mmol) of melamine, 0.40 g (3.9 mmol) of diethylenetriamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and diethylenetriamine as an amine component. The flame retardant composition had an amine excess of 3.4 mol %. The ratios of orthophosphoric acid and pyrophosphoric acid to the total (poly)phosphoric acids of the amine (poly)phosphate were 1.0% and 98.0%, respectively.

Example 16

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.40 g (39.5 mmol) of piperazine, 4.20 g (33.3 mmol) of melamine, 0.30 g (3.2 mmol) of aniline, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and aniline as an amine component. The flame retardant composition had an amine excess of 2.1 mol %. The ratios of orthophosphoric acid and pyrophosphoric acid to the total (poly)phosphoric acids of the amine (poly)phosphate were 1.2% and 97.6%, respectively.

Example 17

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.40 g (39.5 mmol) of piperazine, 4.20 g (33.3 mmol) of melamine, 0.30 g (2.8 mmol) of 1,2-diaminobenzene, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and 1,2-diaminobenzene as an amine component. The flame retardant composition had an amine excess of 1.7 mol %. The ratios of orthophosphoric acid and pyrophosphoric acid to the total (poly)phosphoric acids of the amine (poly)phosphate were 0.7% and 97.7%, respectively.

Example 18

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.40 g (39.5 mmol) of piperazine, 4.20 g (33.3 mmol) of melamine, 0.30 g (2.8 mmol) of 1,4-diaminobenzene, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine, piperazine, and 1,4-diaminobenzene as an amine component. The flame retardant composition had an amine excess of 4.2 mol %. The ratios of orthophosphoric acid and pyrophosphoric acid to the total (poly)phosphoric acids of the amine (poly)phosphate were 0.7% and 97.8%, respectively.

Comparative Example 1

In a 2 L beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.46 g (40.2 mmol) of piperazine, 4.13 g (32.7 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component. The flame retardant composition had an amine excess of 0.0 mol %. The ratios of orthophosphoric acid and pyrophosphoric acid to the total (poly)phosphoric acids of the amine (poly)phosphate were 0.7% and 98.4%, respectively.

Comparative Example 2

In a 2 L beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 2.54 g (29.5 mmol) of piperazine, 6.82 g (54.1 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component. The flame retardant composition had an amine excess of 0.0 mol %. The ratios of orthophosphoric acid and pyrophosphoric acid to the total (poly)phosphoric acids of the amine (poly)phosphate were 0.7% and 98.4%, respectively.

Comparative Example 3

In a 2 L beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture were added 15.0 g (56.4 mmol) of sodium pyrophosphate and 2.0 g of sodium tripolyphosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a mixed aqueous solution of pyrophosphoric acid and tripolyphosphoric acid. To the resulting mixed aqueous solution were added 3.63 g (42.1 mmol) of piperazine, 5.06 g (40.1 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component and pyrophosphoric acid and tripolyphosphoric acid as a (poly)phosphoric acid component. The flame retardant composition had an amine excess of −3.7 mol %. The ratios of orthophosphoric acid and pyrophosphoric acid to the total (poly)phosphoric acids of the amine (poly)phosphate were 1.0% and 87.8%, respectively.

Comparative Example 4

In a 2 L beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 3.75 g (43.5 mmol) of piperazine, 5.68 g (45.0 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component. The flame retardant composition had an amine excess of 16.8 mol %. The ratios of orthophosphoric acid and pyrophosphoric acid to the total (poly)phosphoric acids of the amine (poly)phosphate were 1.6% and 95.9%, respectively.

Comparative Example 5

In a 2 L beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture were added 2.0 g (17.4 mmol) of a 85% aqueous solution of orthophosphoric acid, 15.0 g (56.4 mmol) of sodium pyrophosphate, and 0.8 g of sodium tripolyphosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a mixed aqueous solution of orthophosphoric acid, pyrophosphoric acid, and tripolyphosphoric acid. To the resulting mixed aqueous solution were added 5.50 g (63.9 mmol) of piperazine, 6.36 g (50.4 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component and orthophosphoric acid, pyrophosphoric acid, and tripolyphosphoric acid as a (poly)phosphoric acid component. The flame retardant composition had an amine excess of 26.1 mol %. The ratios of orthophosphoric acid and pyrophosphoric acid to the total (poly)phosphoric acids of the amine (poly)phosphate were 14.1% and 79.5%, respectively.

Comparative Example 6

In a 2 L beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture were added 3.1 g (26.9 mmol) of a 85% aqueous solution of orthophosphoric acid and 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a mixed aqueous solution of orthophosphoric acid and pyrophosphoric acid. To the resulting mixed aqueous solution were added 5.50 g (63.9 mmol) of piperazine, 6.36 g (50.4 mmol) of melamine, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and piperazine as an amine component and orthophosphoric acid and pyrophosphoric acid as a (poly)phosphoric acid component. The flame retardant composition had an amine excess of 26.9 mol %. The ratios of orthophosphoric acid and pyrophosphoric acid to the total (poly)phosphoric acids of the amine (poly)phosphate were 20.8% and 77.5%, respectively.

Comparative Example 7

In a 2 L-beaker were put 750 ml of ultrapure water and 750 ml of a cation exchange resin (SK1BH from Mitsubishi Chemical Corp.; 2.0 meq/ml) and cooled to or below 1° C. in an ice bath. To the cooled mixture was added 15.0 g (56.4 mmol) of sodium pyrophosphate. After stirring the resulting solution for 2 hours, the cation exchange resin was removed by filtration. To complete sodium ion exchange, the filtrate solution was passed through a column packed with 150 ml of the same cation exchange resin. The solution remaining in the column was effused by passing 1.5 L of ultrapure water, and the effluent was combined with the previous effluent to give a pyrophosphoric acid aqueous solution. To the pyrophosphoric acid aqueous solution were added 10.00 g (79.3 mmol) of melamine, 7.80 g (45.8 mmol) of 10% aqueous ammonia, and 750 ml of water, and the mixture was stirred for 3 hours. Water was completely removed using a rotary evaporator under reduced pressure at or below 30° C. to give an amine (poly)phosphate, i.e., a flame retardant composition. The amine (poly)phosphate of the flame retardant composition contained melamine and ammonia as an amine component. The flame retardant composition had an amine excess of 10.6 mol %. The ratios of orthophosphoric acid and pyrophosphoric acid to the total (poly)phosphoric acids of the amine (poly)phosphate were 0.4% and 98.1%, respectively.

Hydrolysis Resistance

Each of the flame retardant compositions prepared in Examples and Comparative Examples was put in a polyethylene bag and stored at 25° C. and RH 50%. After 100 day storage, the ratio (mass %) of orthophosphoric acid to the total (poly)phosphoric acids contained in the amine (poly) phosphate was determined, and the change in the orthophosphoric acid ratio was calculated according to the following formula. The flame retardant composition showing a change of less than 1% in the ratio was rated "pass", while that showing a change of 1% or more in the ratio was rated "fail".

Change in orthophosphoric acid ratio (%)=[ratio (mass %) of orthophosphoric acid to the total (poly)phosphoric acids of amine (poly)phosphate after hydrolysis resistance test]−[ratio (mass %) of orthophosphoric acid to the total (poly)phosphoric acids of amine (poly)phosphate before hydrolysis resistance test]

Flame Retardancy

A hundred parts of polypropylene (MFR: 8 g/10 min, measured according to JIS K7210 at 230° C. and 2.16 kg load) was mixed with 0.07 parts of calcium stearate, 0.14 parts of tetrakis[3-(3,5-di-t-butyl-4-hydroxyphenyemethyl propionate]methane as a phenol antioxidant, and 0.14 parts of tris(2,4-di-t-butylphenyl) phosphite as a phosphorous antioxidant to prepare a polypropylene resin composition. The polypropylene resin composition was compounded with 43 parts of each flame retardant composition of Examples and Comparative Examples per 100 parts of the polypropylene to make a flame-retardant synthetic resin composition.

The resulting flame-retardant synthetic resin composition was press molded at 220° C. and 5 to 15 MPa for 10 minutes to make a specimen for flammability test measuring 127 mm×12.7 mm×1.6 mm (t). The specimen was tested by the 20 mm vertical burning test (UL-94V) in accordance with ISO 1210. Specifically, the specimen was held with the long axis vertical. A flame of a burner was applied to the lower end of the specimen for 10 seconds and removed, and the flame duration was recorded. As soon as the specimen stopped burning, the flame was reapplied for an additional 10 seconds, and the flame duration was measured as in the first flame application. Ignition of the cotton layer placed below the specimen by any drips of flaming particles was also observed. The flame duration after each flame application and the ignition of the cotton layer were interpreted into a UL-94V flammability rating. The V-0 rating is the lowest flammability. The V-1 rating is less flame retardancy, and V-2 rating is still less flame retardancy. A specimen that met the V-0 standard was rated "pass", and a specimen that failed to meet the V-0 standard was rated "fail". The results are shown in Table 1 below.

Resistance to Discoloration by Weathering (JIS K7373)

A hundred parts of polypropylene (MFR: 8 g/10 min, measured according to JIS K7210 at 230° C. and 2.16 kg load) was mixed with 0.07 parts of calcium stearate, 0.14 parts of tetrakis[3-(3,5-di-t-butyl-4-hydroxyphenyemethyl propionate]methane as a phenol antioxidant, 0.14 parts of tris(2,4-di-t-butylphenyl) phosphite as a phosphorous antioxidant, and 0.28 parts of ADK STAB LA-502 as a light stabilizer to prepare a polypropylene resin composition. The polypropylene resin composition was compounded with 39 parts, per 100 parts of the polypropylene, of each flame retardant composition of Examples and Comparative Examples to make a flame-retardant synthetic resin composition. An accelerated weathering test was performed on the resulting flame-retardant synthetic resin composition using a weathering instrument (with rain; black panel temperature: 63° C.; 1200 hrs). After 1200 hour weathering, the yellowness index (YI) and the change of yellowness index (ΔYI) of the test sample were determined according to JIS K7373. A flame-retardant synthetic resin composition having a ΔYI of smaller than 5 was rated "pass", and one having a ΔYI of 5 or greater "fail". A flame-retardant synthetic resin composition a test sample of which became brittle to cause a crack before 1200 hours was also rated "fail" The results of evaluation are shown in Table 1.

TABLE 1

|  | Amine Excess of Flame Retardant Composition (mol %) | Hydrolysis Resistance | Flame Retardancy | Resistance to Discoloration by Weathering |
|---|---|---|---|---|
| Example 1 | 4.8 | pass | pass | pass |
| Example 2 | 2.3 | pass | pass | pass |
| Example 3 | 2.9 | pass | pass | pass |
| Example 4 | 5.0 | pass | pass | pass |
| Example 5 | 9.8 | pass | pass | pass |
| Example 6 | 2.5 | pass | pass | pass |
| Example 7 | 3.0 | pass | pass | pass |
| Example 8 | 3.2 | pass | pass | pass |
| Example 9 | 3.6 | pass | pass | pass |
| Example 10 | 3.0 | pass | pass | pass |
| Example 11 | 3.7 | pass | pass | pass |
| Example 12 | 1.9 | pass | pass | pass |
| Example 13 | 3.5 | pass | pass | pass |
| Example 14 | 4.9 | pass | pass | pass |
| Example 15 | 3.4 | pass | pass | pass |
| Example 16 | 2.1 | pass | pass | pass |

TABLE 1-continued

| | Amine Excess of Flame Retardant Composition (mol %) | Hydrolysis Resistance | Flame Retardancy | Resistance to Discoloration by Weathering |
|---|---|---|---|---|
| Example 17 | 1.7 | pass | pass | pass |
| Example 18 | 4.2 | pass | pass | pass |
| Comp. Example 1 | 0.0 | fail | pass | fail |
| Comp. Example 2 | 0.0 | fail | pass | fail |
| Comp. Example 3 | −3.7 | fail | pass | fail |
| Comp. Example 4 | 16.8 | pass | fail | pass |
| Comp. Example 5 | 26.1 | pass | fail | pass |
| Comp. Example 6 | 26.9 | pass | fail | pass |
| Comp. Example 7 | 10.6 | pass | fail | fail |

It is seen from the results in Table 1 that the requirements for hydrolysis resistance, flame retardancy, and resistance to discoloration by weathering are all satisfied by limiting the amine excess of the amine (poly)phosphate-containing flame retardant composition to within the range of from 0.01 to 10 mol %.

INDUSTRIAL APPLICABILITY

The invention provides a flame retardant composition and a flame-retardant synthetic resin composition that exhibit hydrolysis resistance and weatherability as well as flame retardancy.

The invention claimed is:

1. A flame retardant composition comprising an amine (poly) phosphate and having an amine excess of 0.01 to 10 mol %, the amine excess being represented by formula (1):

Amine excess (mol %)=[Σ($A_n$×$B_n$(mol))−phosphorus atoms (mol) contained in flame retardant composition]/phosphorus atoms (mol) contained in flame retardant composition×100    (1)

wherein n represents the number of the kinds of the amines in the amine (poly) phosphate; $A_1$ to $A_n$ each represent the maximum number of dissociation stages of the respective amines, the maximum number of dissociation stages being defined as the maximum number of the dissociation stages in which the base dissociation constant pKb is in the range of from 0 to 13 at 25° C.; and $B_1$ to $B_n$ each represent the number of moles of the respective amines of the amine (poly) phosphate when the amine is assumed to be present alone;

wherein the amine of the amine (poly) phosphate comprises melamine and piperazine, and further comprises at least one member selected from the group consisting of a monoalkylamine, a dialkylamine, a trialkylamine, an aromatic amine, a 5-membered aromatic heterocyclic amine with 2 to 4 carbon atoms, polycyclic aromatic heterocyclic amine with 5 to 12 carbon atoms, ethanolamine, and diethanolamine;

wherein said aromatic amine comprises an aromatic monoamine, an aromatic diamine or 1,3,5-triaminobenzene; and wherein said monoalkylamine is of the formula $R^1NH_2$, wherein $R^1$ represents a straight or branched chain alkyl group having 1 to 8 carbon atoms.

2. The flame retardant composition according to claim 1, wherein the amine of the amine (poly)phosphate comprises at least one member selected from the group consisting of diethylamine, ethanolamine, diethanolamine, aniline, melamine, morpholine, ethylenediamine, piperazine, 1,2-diaminobenzene, 1,4-diaminobenzene, methylamine, ethylamine, and dimethylamine.

3. The flame retardant composition according to claim 2, wherein the amine excess is 0.1 mol % or higher and lower than 10 mol %.

4. The flame retardant composition according to claim 1, wherein the amine excess is 0.1 mol % or higher and lower than 10 mol %.

5. The flame retardant composition according to claim 1, wherein the amine (poly) phosphate comprises a pyrophosphate and a ratio of pyrophosphoric acid to the total (poly) phosphoric acids in the amine (poly) phosphate is 80 to 99.99 mass %.

6. The flame retardant composition according to claim 1, wherein the amine (poly) phosphate comprises an orthophosphate and a ratio of orthophosphoric acid to the total (poly) phosphoric acids in the amine (poly) phosphate is 5 mass % or lower.

7. A flame-retardant synthetic resin composition comprising the flame retardant composition according to claim 1.

8. A flame-retardant synthetic resin molded article comprising the flame-retardant synthetic resin composition according to claim 7.

9. A flame retardant composition comprising an amine (poly) phosphate and an amine compound and having an amine excess of 0.01 to 10 mol %, the amine excess being represented by formula (1):

Amine excess (mol %)=[Σ($A_n$×$B_n$(mol))−phosphorus atoms (mol) contained in flame retardant composition]/phosphorus atoms (mol) contained in flame retardant composition×100    (1)

wherein n represents the total of the number of the kinds of amines in the amine (poly) phosphate and the number of the kinds of the amine compounds; $A_1$ to $A_n$ each represent the maximum number of dissociation stages of the respective amines and amine compounds, the maximum number of dissociation stages being defined as the maximum number of the dissociation stages in which the base dissociation constant pKb is in the range of from 0 to 13 at 25° C.; and $B_1$ to $B_n$ each represent the number of moles of the respective amines of the amine (poly) phosphate when the amine is assumed to be present alone or the number of moles of the respective amine compounds;

wherein the amine of the amine (poly) phosphate comprises melamine and piperazine, and further comprises at least one member selected from the group consisting of a monoalkylamine, a dialkylamine, a trialkylamine, an aromatic amine, a 5-membered aromatic heterocyclic amine with 2 to 4 carbon atoms, a polycyclic aromatic heterocyclic amine with 5 to 12 carbon atoms, ethanolamine, and diethanolamine;

wherein said aromatic amine comprises an aromatic monoamine, an aromatic diamine or 1,3,5-triaminobenzene; and wherein said monoalkylamine is of the formula $R^1NH_2$, wherein $R^1$ represents a straight or branched chain alkyl group having 1 to 8 carbon atoms.

10. The flame retardant composition according to claim 9, wherein the amine of the amine (poly)phosphate comprises at least one member selected from the group consisting of diethylamine, ethanolamine, diethanolamine, aniline, melamine, morpholine, ethylenediamine, piperazine, 1,2-diaminobenzene, 1,4-diaminobenzene, methylamine, ethylamine, and dimethylamine.

11. The flame retardant composition according to claim 9, wherein the amine excess is 0.1 mol % or higher and lower than 10 mol %.

* * * * *